| United States Patent [19] | [11] Patent Number: 4,792,360 |
| Pierce et al. | [45] Date of Patent: Dec. 20, 1988 |

[54] WORKABLE CEMENT COMPOSITION OF LOW WATER CONTENT CONTAINING A HYDROXYALKYL (METH)ACRYLATE POLYMER

[75] Inventors: Richard A. Pierce; Tipton T. Masterson; David A. Grilli, all of Lake Jackson, Tex.

[73] Assignee: The Dow Chemical Company, Midland, Mich.

[21] Appl. No.: 67,915

[22] Filed: Jun. 30, 1987

[51] Int. Cl.$^4$ ............................................. C04B 24/00
[52] U.S. Cl. ..................................... 106/90; 106/314
[58] Field of Search ................................. 106/314, 90

[56] References Cited

U.S. PATENT DOCUMENTS 4,473,406 9/1984 Bradley et al. ..................... 106/314
4,524,163 6/1985 Bradley et al. ..................... 106/90

OTHER PUBLICATIONS

Gierloff, "Plastic Dispersions Based on Polyacrylic Acid Esters as Concrete Additives" Amts-Mitteilungsbl., Bundesanst, Materialpruef, Berlin 1979, 9, (1), 2–7, (Ger.), C.A., 91:127973d.

Primary Examiner—William R. Dixon, Jr.
Assistant Examiner—David M. Brunsman
Attorney, Agent, or Firm—A. Cooper Ancona

[57] ABSTRACT

Cement compositions having better and longer lasting workability have been made by adding to said compositions a polymer or copolymer of a hydroxyalkyl(meth)acrylate, e.g. hydroxyethyl acrylate or methacrylate. Further improvement is achieved by adding a water reducer, e.g. sulfonated polystyrene, and an antifoam agent, e.g. a polyalkylenepolyol.

26 Claims, No Drawings

WORKABLE CEMENT COMPOSITION OF LOW WATER CONTENT CONTAINING A HYDROXYALKYL (METH)ACRYLATE POLYMER

BACKGROUND OF THE INVENTION

Cement is employed in compositions to form concrete, grouting and mortar, which compositions also contain other components such as sand, gravel or stone. Although there are several classes of hydraulic cements, eg. gypsum, high alumina cements and Portland cement, the latter is the most commonly used in structural applications and is high in silica content. In this disclosure the term "cement" shall refer to silicate cement compositions including Portland cement, pozzolanic cements, hydraulic limes, fly ash and natural cements.

Cement compositions are rendered useful by combining its solid components with water. An amount of water in excess of that required for hydration is necessary to obtain a mixture with sufficient workability, i.e. gives a mixture which flows readily for pouring into a form or mold of the desired structure. During the hardening process, the excess water remains and, as it evaporates, causes cavities to be formed in the molded structure. These cavities reduce the integrity of the structure and result in a lower compressive strength than is theoretically attainable. It, therefore, is desirable to use the lowest amount of water possible with the composition in order to obtain the best compressive strength. Low amounts of water, however, make workability difficult so that a compromise must be made.

Additives which cause the strengthening of cement mixtures while allowing adequate workability are commonly referred to as water reducers or plasticizers. Additives which allow very low water levels are called superplasticizers. When used in mixtures containing normal levels of water, the result in a mixture having increased fluidity and workability. Commonly used commercially available compounds useful as superplasticizers include sulfonated melamine-formaldehyde condensates, sulfonated naphthalene-formaldehyde condensates, sulfonated polystyrenes and sulfonated styrene/maleic anhydride copolymers as well as other sulfonated copolymers of styrene. Naphthalene-formaldehyde sulfonates and salts of sulfonated styrene-indene copolymers are taught as fluidizing agents in U.S. Pat. Nos. 4,164,426 and 4,071,493, respectively. Sulfonated polymers and copolymers of styrene are taught in British Patent No. 1,588,130 and U.S. Pat. No. 4,076,699, respectively.

The present invention provides new compositions comprising polymers and copolymers of hydroxyalkyl (meth)acrylates as fluidizing agents for cement mixtures.

SUMMARY OF THE INVENTION

Cement compositions having improved workability are provided when a polymer or copolymer of a hydroxyalkyl (meth)acrylate is added to cement-containing mixtures. Optionally and preferably the admixture also contains a known water reducer, eg., a sulfonated styrene polymer or copolymer, and an antifoam agent, eg., a polyglycol.

DETAILED DESCRIPTION OF THE INVENTION

Compositions containing a polymer or copolymer of a hydroxyalkyl (meth)acrylated have been found to provide improved workability when added to cement mixtures. Polymers and copolymers of hydroxyethyl-, hydroxypropyl-, 4-hydroxybutyl- and 2-hydroxybutyl esters of acrylic or methacrylic acids have been found to be effective. The copolymers can be of the above esters with each other or with acrylic or methacrylic acids or their salts. Another compound found to be useful as a monomer or co-monomer is 2-sulfoethyl methacrylate (2-SEM).

Poly[hydroxyalkyl (meth)acrylates] having molecular weights ($\overline{M}w$) of from about 2,000 to about 150,000 are suitable for use in cement mixtures. Those having molecular weights in the range of from about 3,000 to about 50,000 are preferred and most preferred are those having molecular weights in the range of from about 4,000 to about 10,000. The above ranges also include copolymers of any of the hydroxyalkyl (meth)acrylates with each other or with the other co-monomers mentioned. The use of the term "(meth)acrylate" is to be construed as meaning either or both acrylic and methacrylic acid esters useful in the composition.

Generally, the homopolymers and copolymers of the hydroxyalkyl (meth)acrylates and water soluble at room temperature and maintain their solubility as the temperature rises. Certain of the homopolymers of 2-hydroxybutyl acrylate (2-HBA) and hydroxypropyl acrylate (HPA) have an inverse solubility, being more soluble at low temperatures and less soluble or even insoluble at higher temperatures.

Amounts of the polymers and copolymers of the hydroxyalkyl esters of acrylic and methacrylic acids which have been found to be useful in the cement compositions of the present invention are in the range of from about 0.01 to about 1.0 percent based on the weight of the cement. Preferred amounts will be in the range of from about 0.1 to about 0.5, depending upon the particular application in which the cement mixture is being used.

Methods of preparing polymers and copolymers of hydroxyalkyl (meth)acrylates are well known to the art. Thus, hydroxyalkyl acrylate monomers are readily polymerized in aqueous solution using free radical initiators, e.g. peroxides or persulfates. The molecular weight can be varied by using different initiators in different amounts and under different conditions of feed rate, temperature and other typical parameters for the reaction.

Water reducers known to the art are advantageously, but optionally, employed with the polymers and copolymers of the invention in cement compositions. Such known water reducers are employed in the cement slurry at from about 0.05 to about 2.0 percent based on the dry weight of the cement, preferably from about 0.1 to about 0.5 percent. These include the sulfonated polystyrenes and sulfonated copolymers of styrene with other copolymerizable aromatics, eg., maleic anhydride or alpha methyl styrene. Copolymers of the latter are described in a copending application of one of the present inventors entitled "High Efficiency Superplasticizer for Cement Compositions", Ser. No. 873,900, filed June 13, 1986, now U.S. Pat. No. 4,704,415. The copolymers described therein are incorporated herein by reference. A preparation of polymers and copolymers of styrene is described in U.S. Pat. No. 4,076,699 and is incorporated herein by refernece.

Antifoam agents are also optionally, but advantageously, employed together with the polymers and copolymers of the invention in cement compositions. Antifoamers such as polysiloxanes and polyetherpolyols are employed at levels within the range of from about 50 to about 200 ppm., based on the weight of the cement and preferably from about 75 to about 150 ppm. Particularly useful are the polyetherpolyols which are triols (glycerine initiated polyols) having a molecular weight of about 5,000. Such polyols are included in the group of commercial compounds sold as VORANOL* polyols. Polysiloxanes having similar molecular weights are also useful as antifoam agents.

*Trademark of The Dow Chemical Company

Most preferred compositions are those which contain the combination of polymers or coplymers of the invention together with both the water reducer and the antifoam compounds.

The following examples are representative of the invention and of the prior art with which they are compared

REPRESENTATIVE EXAMPLE

Mortar samples are prepared by dry-blending 2800 g of dry sand and 1200 g of Type I Portland cement for 30 seconds in a HOBART* mixer at low speed. The sand and mortar are then mixed with water by adding it to the dry ingredients during the first 30 seconds of a mixing cycle which consists of mixing at low speed for two minutes, stopping for one minute and then continuing the low speed mixing for another two minutes. The polymer or copolymer of hydroxyalkyl acrylate (HAA) or hydroxyalkyl methacrylate (HAMA) is added to the start of the second two-minute mixing period. Any other additives, eg antifoam agents, are also added at this time. The polymer or copolymer of the invention is added in a preferred amount of from about 0.1 to about 0.5 percent based on the weight of the dry cement. The amount of water added is that which will provide a ratio of water to cement of 0.4. The sides and bottom of the bowl are scraped thoroughly during the one minute interval between the mixing periods.

*A trademark for a mixer manufactured by the Hobart Company. A Model N-50, 3-speed mixer was employed.

A number of different poly(hydroxyethyl acrylates)-(poly HEA) are employed in the Examples of the invention. The different polymers and their molecular weights are shown as Samples 1-8 in Table I.

TABLE I

| Sample Number | Molecular weight (Mw) | Molecular weight (Mn) |
|---|---|---|
| 1 | 3,990 | 1,544 |
| 2 | 6,739 | 2,024 |
| 3 | 8,373 | 2,667 |
| 4 | 23,520 | 4,377 |
| 5 | 44,938 | 6,633 |
| 6 | 89,712 | 11,851 |
| 7 | 133,060 | 18,760 |
| 8* | 2,000–5,000 | — |

*The polymer of Sample 8 is a copolymer of HEA/2-SEM in a molar ratio of 1/1.

Each of the polymer samples is added to a mixture of the mortar prepared as described in the Representative Example above. Each of the mixtures contains 2800 g of sand and 1200 g of the Portland cement, including the blank (A) which contains no additives. The water to cement ratio, the same in all mixtures, is 0.4. An amount of each polymer indicated in Table I is added to the cement mixture in order to provide 0.25% by weight based on the dry weight of cement.

EXAMPLE 1

Samples are prepared as indicated and the Vicat cone penetration is conducted according to ASTM method C780-80. Penetrations are measured and the weight of each 12-oz. (355 cm$^3$) sample is recorded. Densities are obtained by averaging the weights of 5 or 6 replications of each sample. The weight percent of polymer is as indicated above for all samples except for Sample 8 which is present in the cement mixture at 0.5% based on the weight of dry cement. Data is summarized in Table II.

TABLE II

| Sample Number | Density (g/mL) | Vicat Penetration (mm) at the time given in minutes. | | | | | |
|---|---|---|---|---|---|---|---|
| | | 10 | 20 | 30 | 40 | 50 | 60 |
| A (Blank) | 2.23 | 29.0 | 29.0 | 25.0 | 24.0 | 23.0 | — |
| 1 | 1.92 | 56.5 | 58.0 | 51.5 | 46.0 | 48.0 | 48.5 |
| 2 | 1.88 | 54.5 | 54.5 | 44.5 | 49.0 | 42.0 | 40.0 |
| 3 | 1.81 | 64.0 | 58.0 | 52.0 | 48.5 | 48.0 | 40.5 |
| 4 | 1.78 | 68.0 | 59.0 | 47.5 | 50.0 | 41.0 | 38.0 |
| 5 | 1.67 | 68.5 | 57.0 | 40.0 | 34.0 | 29.0 | 27.0 |
| 6 | 1.78 | 62.0 | 45.0 | 33.0 | 27.0 | 25.5 | 20.0 |
| 7 | 1.82 | 53.0 | 35.0 | 21.5 | 18.5 | 17.0 | 14.0 |
| 8 | 1.89 | 64.0 | 59.0 | 54.5 | 54.5 | 51.0 | 59.0 |

The density of the cement mixture is a factor affecting the workability of the mix, the less dense mixtures being easier to work. One factor affecting the density of the mixture is the amount of entrained air, the density of a given mixture being inversely proportional to the amount thereof. Thus, those mixtures containing more air will be easier to work.

The data in Table II shows that density of the cement mix decreases with an increase in molecular weight ($\overline{M}w$) of the poly(HEA) additive until the molecular weight reaches about 50,000 at which point the density begins to increase as the molecular weight increases. The amount of air entrained, therefore, can be controlled by choosing a polymer having a particular molecular weight.

The following examples show the use of the poly(hydroxyethyl acrylate) in conjunction with an antifoam agent which, while operational, shows an improvement over the use of the poly(HEA) alone.

EXAMPLE 2

In this experiment each of the polymer Samples of Table I is used in combination with an antifoam agent to compare with known commercially available water reducers, or superplasticizers, used alone and with the antifoam agent. The mortar mixes are prepared in the manner of the Representative Example and the antifoam agent is used in the quantity of 100 ppm. The antifoam agents employed are a glycerolinitiated polyether polyol(VORANOL 4702) having a molecular weight of about 5,000 and a polysiloxane (GE AF 93), available from General Electric Co., which are defined in Table I as X and Y, respectively. The water reducers used for comparison are commercially available products. Product B is a sulfonated polystyrene sold as VERSA-TL 127 by National Starch and Chemical Co. and is employed in an amount of 1.0%. Product C is a water reducer sold as MIGHTY TM 150 by Imperial Chemical Industries, Ltd. and employed in an amount of 0.5%. Both products are employed in the indicated amounts (based on weight of dry cement) in a mortar mixture prepared as in the other examples and run for comparison. The poly(HEA) samples are used in the same amounts as in Example 1. Table III shows the results of these experiments.

TABLE III

| Sample Number | Antifoam | Density (g/mL) | Vicat Penetration (mm) at the time (min) | | | | |
|---|---|---|---|---|---|---|---|
| | | | 10 | 20 | 30 | 40 | 50 |
| A (Blank) | | 2.26 | 36.5 | 30.5 | 31.0 | 27.5 | 22.0 |
| 1 | X | 2.24 | 28.5 | 31.5 | 40.5 | 43.5 | 46.6 |
| 2 | X | 2.26 | 35.5 | 38.0 | 53.5 | 57.0 | 53.5 |
| 2 | Y | 2.03 | 41.0 | 42.0 | 51.5 | 55.0 | 46.0 |
| 3 | X | 2.26 | 34.0 | 40.0 | 48.0 | 55.0 | 53.5 |
| 4 | X | 2.27 | 29.0 | 36.0 | 46.0 | 48.0 | 46.5 |
| 5 | X | 2.26 | 25.5 | 33.5 | 47.0 | 49.5 | 44.0 |
| 6 | X | 2.24 | 23.5 | 20.5 | 27.0 | 34.5 | 23.0 |
| 7 | X | 2.24 | 21.5 | 18.5 | 30.0 | 29.5 | 25.0 |
| B | X | 2.16 | 59.5 | 53.0 | 51.5 | 44.0 | 40.5 |
| C | — | 2.19 | 59.0 | 55.5 | 42.0 | 44.0 | 44.0 |

While the known water reducers and antifoam agents are each advantageously employed separately with the poly(hydroxyalkyl acrylates), the most preferred method of use in the cement mix is for both to be used together in combination with the poly(HAA).

EXAMPLE 3

The following experiments show the use of combinations of an HEA polymer or copolymer in combination with both an antifoam and a water reducer. The sand and cement are used in the same quantities employed in the preceding examples. In this example the polymers of the invention are employed at 0.25% (unless otherwise indicated), the water reducer and the antifoam agent are employed at 1.0% and 100 ppm., respectively, based on the weight of the dry cement, except that with Sample 8 the antifoam and water reducer are employed at 150 ppm. and 0.12%, respectively. Tables IV and V show the results; the symbols employed therein for the particular water reducer and antifoam used are the same designations used above. The water reducer identified as product D is a commercially available sulfonated styrene-maleic anhydride copolymer having a $\overline{M}w$ of 1000 (S-SMA 1000L)* and product E is a sulfonated styrene-α-methylstyrene copolymer (S-SAMS) having a $\overline{M}w$ of ~10,000. In the Comparative Examples (Comp.) in Table IV no polymer or copolymer of the invention is used, but two different water reducers are employed (B at 1.0% and D at 0.3%) together with an antifoam agent, the same one used for the examples of the invention and employed at a concentration of 100 ppm.
*Trademark of Atlantic Richfield Co.

TABLE IV

| Sample No. | Antifoam | H$_2$O Reducer | Density | Vicat Penetration (mm) at the time given in minutes | | | | |
|---|---|---|---|---|---|---|---|---|
| | | | | 10 | 20 | 30 | 40 | 50 |
| A Blank | — | — | 2.26 | 36.5 | 30.5 | 31.0 | 27.5 | 22.0 |
| 3 | X | D | 2.21 | 69.5 | 63.5 | 57.0 | 52.0 | 54.5 |
| 3 | X | B | 2.18 | 59.5 | 54.5 | 47.5 | 57.0 | 49.0 |
| Comp. | X | D | 2.21 | 74.5 | 61.5 | 52.0 | 51.5 | 43.5 |
| Comp. | X | B | 2.16 | 59.5 | 53.0 | 51.5 | 44.0 | 40.5 |

TABLE V

| Sample No. | Antifoam | H$_2$O Reducer | Density | Vicat Penetration (mm) at the time given in minutes | | | | |
|---|---|---|---|---|---|---|---|---|
| | | | | 20 | 40 | 60 | 80 | 100 |
| 2# | X | D | 2.22 | 57.5 | 45.0 | 34.0 | 25.0 | 21.0 |
| 2 | X | D | 2.18 | 57.0 | 52.5 | 55.5 | 50.5 | 45.5 |
| 8 | X | E | 2.14 | 53.5 | 53.5 | 49.5 | 43.5 | 40.5 |

The polymer in this run is employed at only 0.1% in the cement mixture.

We claim:

1. A cement composition having improved workability comprising cement and a polymer of a hydroxyalkyl (meth)acrylate or a copolymer thereof with another hydroxyalkyl (meth)acrylate or with sulfoethyl methacrylate.

2. The composition of claim 1 wherein the hydroxyalkyl group contains 2-4 carbon atoms.

3. The composition of claim 2 wherein the polymer or copolymer has a molecular weight (Mw) of from about 2,000 to about 150,000.

4. The composition of claim 3 wherein the polymer or copolymer has a molecular weight (Mw) of from about 3,000 to about 50,000.

5. The composition of claim 4 wherein the polymer or copolymer has a molecular weight (Mw) of from about 4,000 to about 10,000.

6. The composition of claim 1 wherein the polymer or copolymer is present in an amount of from about 0.01 to about 1.0 percent based on the weight of the dry cement.

7. The composition of claim 6 wherein the polymer or copolymer is present in an amount of from about 0.1 to about 0.5 based on the weight of the dry cement.

8. The composition of claim 3 wherein the polymer is present in an amount of from about 0.1 to about 0.5 based on the weight of the dry cement.

9. The composition of claim 3 wherein the cement composition contains an antifoam agent.

10. The composition of claim 9 wherein the antifoam agent is a polyetherpolyol or a polysiloxane.

11. The composition of claim 10 wherein the polyetherpolyol is a glycerol derivative.

12. The composition of claim 11 wherein the polyetherpolyol has a molecular weight (Mw) about 5,000.

13. The composition of claim 3 wherein the cement composition contains a water reducing agent.

14. The composition of claim 13 wherein the water reducing agent is a polymer or a copolymer of styrene.

15. The composition of claim 14 wherein the polymer is a homopolymer of styrene.

16. The composition of claim 14 wherein the copolymer is a copolymer of styrene and maleic anhydride.

17. The composition of claim 14 wherein the copolymer is a copolymer of styrene and α-methylstyrene.

18. The composition of claim 2 wherein the composition contains both an antifoam agent and a water reducing agent.

19. The composition of claim 18 wherein the polymer is a polymer of hydroxyethyl acrylate.

20. A cement composition having improved workability comprising cement, an antifoam agent, a water reducing agent and a copolymer of hydroxyethyl acrylate and 2-sulfoethyl methacrylate.

21. The composition of claim 19 wherein the antifoam is a polyetherpolyol and the water reducing agent is a sulfonated polystyrene.

22. The composition of claim 20 wherein the antifoam is a polyetherpolyol and the water reducing agent is a sulfonated polystyrene.

23. A process for improving the workability of a cement composition comprising adding to said cement composition a polymer of a hydroxyalkyl (meth)acrylate or copolymer thereof with another hydroxyalkyl (meth)acrylate.

24. The process of claim 23 wherein the polymer is a polymer of hydroxyethyl acrylate.

25. A process for improving the workability of a cement composition comprising adding to said cement composition a copolymer of hydroxyethyl acrylate and 2-sulfoethyl methacrylate.

26. The process of claim 23 wherein an antifoam agent and a water reducing agent are also added.

* * * * *

UNITED STATES PATENT AND TRADEMARK OFFICE
CERTIFICATE OF CORRECTION

PATENT NO. : 4,792,360

DATED : December 20, 1988

INVENTOR(S) : Richard A. Pierce, et al.

It is certified that error appears in the above-identified patent and that said Letters Patent is hereby corrected as shown below:

Column 2, line 5, "acrylated" should read --acrylate--.

Column 2, line 28, "and" should read --are--.

Column 3, line 17, "coplymers" should read --copolymers--.

Column 3, line 34, "to" should read --at--.

Column 4, line 46, "operational" should read --optional--.

Signed and Sealed this

Nineteenth Day of June, 1990

Attest:

HARRY F. MANBECK, JR.

Attesting Officer

Commissioner of Patents and Trademarks